Aug. 23, 1927.

W. W. SLOANE 1,640,055

POWER SHOVEL

Original Filed Oct. 29, 1925   9 Sheets-Sheet 1

Fig.1

Inventor
William W. Sloane
Clarence F. Poole
Attorney

Inventor
William W. Sloane
by Clarence F. Poole
Attorney

Patented Aug. 23, 1927.

1,640,055

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Original application filed October 29, 1925, Serial No. 65,549. Divided and this application filed October 27, 1926. Serial No. 144,504.

This invention relates to power shovels for use in confined spaces such as in mines, although not limited to this use alone, the general object residing in the provision of a fluid pressure actuating system particularly adapted to power shovels of the above mentioned type and which affords ease and convenience of manipulation and control, all with a view toward high production and general efficiency particularly with relation toward operation in confined spaces as aforesaid.

Referring to the drawings.

Like numerals refer to like parts in the several figures.

Referring now to the drawings, 1 designates a base frame which is carried on laterally spaced continuous tread mechanisms 2 of usual construction which are adapted for the propulsion of the shovel.

Mounted centrally on the base 1 is a vertically disposed cylinder 3 containing a piston 4, arranged so that the piston may be raised by fluid pressure to engage a fixed part, such as a roof, thus forming a holding jack for the machine while it is in operation.

Figure 1:
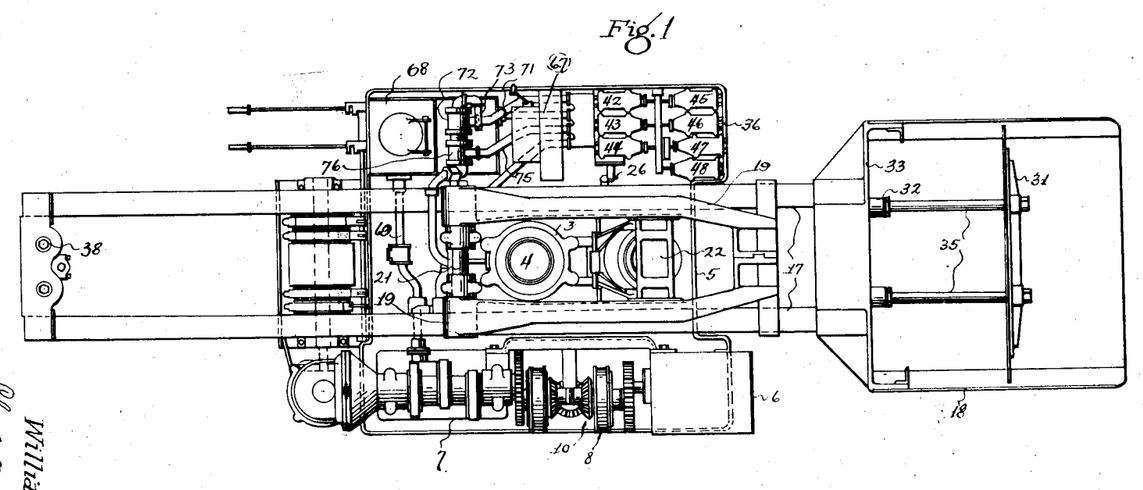
Figure 1 is a plan view of a power shovel embodying one form of my invention with certain parts omitted.
Figure 2:
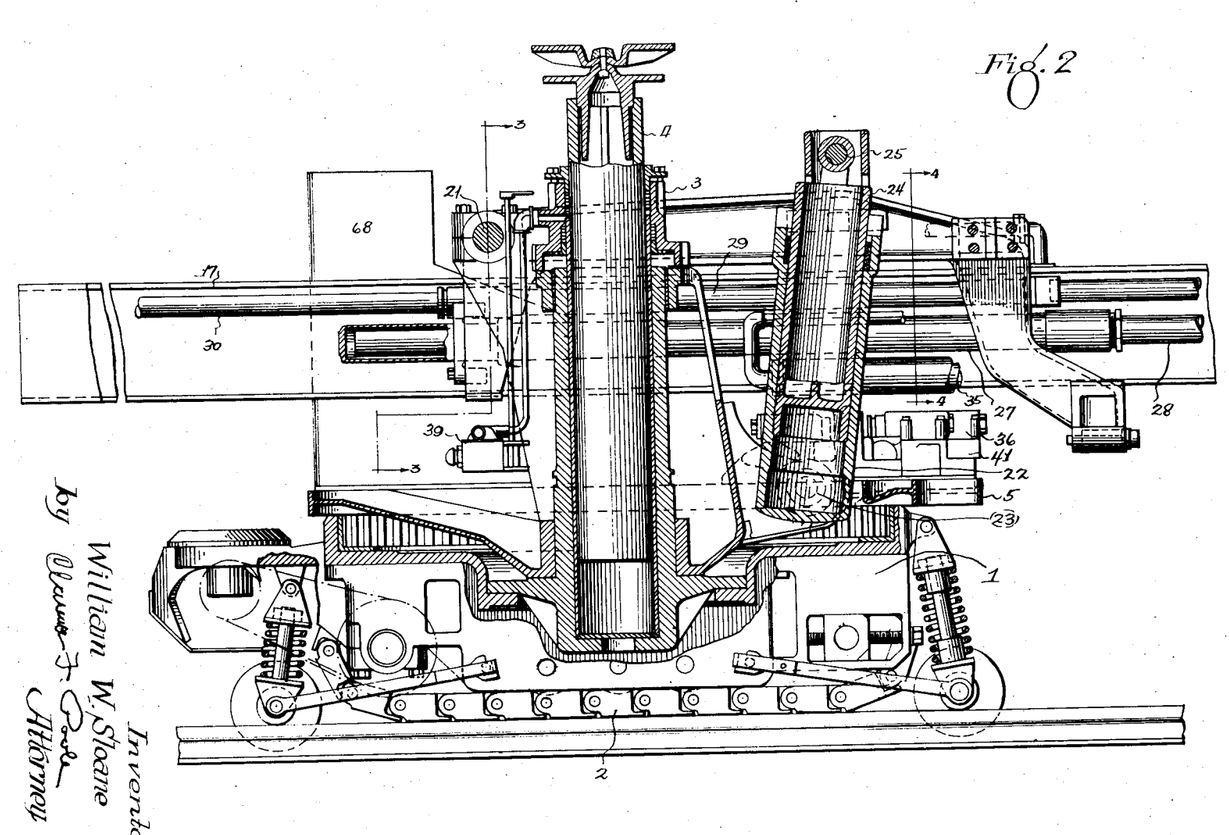
Figure 2 is an enlarged vertical sectional view through the central part of the machine.

A turntable or rotatable frame 5 is carried by the base 1 for movement axially about the vertically disposed cylinder 3, as best shown in Figure 2, and this turntable carries the major portion of the operating mechanism.

An electric motor 6 and a fluid pressure pump 7 are mounted on the turntable and are disposed in horizontal longitudinal alinement along one side thereof. A reduction gear transmission 8 operatively connects the adjacent ends of the shafts of the motor and pump, and a manually controlled reversible driving mechanism 10 is associated with said transmission 8 for angular operation of the turntable on the base.

Carried with the turntable is a beam 17 which carries a scoop 18 secured at the front end thereof. The beam comprises two longitudinal members disposed on opposite sides of the centrally disposed holding jack, and is mounted for longitudinal movement upon an elevating arm 19. See Figures 1, 2, 3 and 4. This elevating arm is journaled at its rear end on a shaft 21, carried by the turntable at an elevated point to the rear of the holding jack, for providing vertical movement of the scoop.

Actuating means for the elevating arm 19 consists of a cylinder 22 disposed forward of the holding jack and pivotally mounted on the turntable 5 by trunnions 23, see Figure 2, and a piston 24 engaged in the cylinder and pivotally connected with the elevating arm as designated at 25. The cylinder 22 is connected with the hydraulic system, hereinafter described, through a swivel joint 26 in axial alinement with the trunnions 23.

Figure 3:
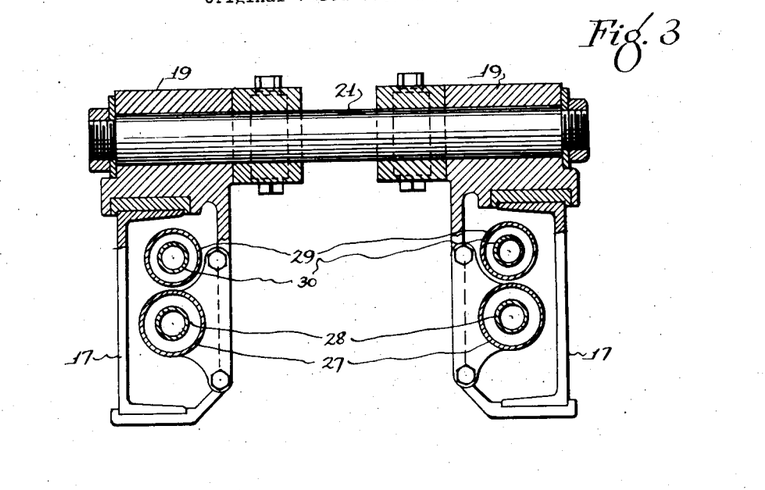
Figure 3 is an enlarged partial section on the line 3—3 of Figure 2.
Figure 4:
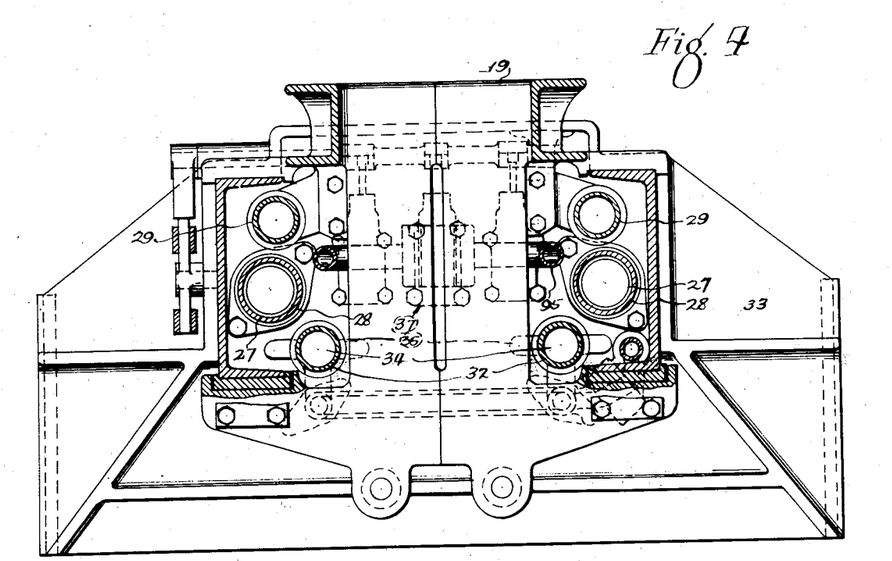
Figure 4 is an enlarged partial sectional view on the line 4—4 of Figure 2.

Radial movement of the scoop 18 by longitudinal movement of the beam 17 is effected hydraulically and for this purpose there are provided two oppositely acting pairs of radial cylinders. The lower and larger pair of cylinders 27, hereinafter called the out cylinders, are secured with the elevating arm 19, as shown in Figure 3, and the plungers 28 thereof are secured with the forward end of the beam 17 in a suitable manner to thrust the beam forwardly. The upper or smaller pair of cylinders 29, hereinafter called the in cylinders, are secured with the elevating arm 19, as shown in Figure 4, and the plungers 30 thereof are secured with the rear end of the beam 17 in a suitable manner to thrust the beam rearwardly.

The scoop 18 is provided with an ejector plate 31 movable longitudinally thereof for ejecting material from the scoop, and actuation of the ejector plate is effected hydraulically in the following manner: Two cylinders 32 are secured to a rear frame 33 of the scoop, this frame being secured to the front end of the beam 17, and the plungers 34 of these cylinders are connected through plunger rods 35 with the ejector plate 31 for moving the ejector plate longitudinally of the scoop outwardly to eject material from the scoop and for retracting the ejector plate to the inner end of the scoop, these cylinders being double acting. See Figures 1 and 2.

The hydraulic system for controlling the various movements of the hydraulically operated parts will now be described.

The pump 7, driven by the electric motor 6, serves to effect the pressure in the system. The connections from the pump to the various actuating parts of the system are effected through valve means, which as shown consist of platform valves generally indicated at 36, front and rear beam valves generally indicated at 37 and 38 respectively, and jack valves generally indicated at 39. The platform valves 36 are mounted on the turntable forwardly and on the side of the beam structure opposite that on which the pump 7 and the motor 6 are disposed. See Figures 1 and 2. The front beam valves 37 are mounted on the beam 17 at the front end thereof, see Figure 4, and the rear beam valves 38 are mounted on the beam at the rear end thereof in a similar manner. The jack valves 39 are mounted on the turntable at the rear side of the jack cylinder 3 and below the beam 17. See Figure 2.

The platform valves 36 are constructed as follows: See Figures 5, 6 and 7. A horizontally disposed manifold 41 is secured on the turntable as shown in Figure 2, and secured downwardly upon the upper face of this manifold are seven poppet valves 42, 43, 44, 45, 46, 47 and 48, respectively. These valves with the exception of valve 47 are similar in construction, each comprising a stem 49, and a piston 50, spaced longitudinally from the head 51 of the valve below the same, and having a by-pass 52 in the body of the valve communicating the upper side of the head with the lower side of the piston to balance the pressure on the upper side of the valve head, a spring 53 being provided to move the valve head into closed position with a relatively light unvarying pressure. See Figure 6. The valve 47 comprises a stem 54, and a piston 55, spaced longitudinally from the head 56 of the valve above the same and having a by-pass, not shown but similar to the by-pass 52 of the other platform valves, in the body of the valve and communicating the lower side of the head with the upper side of the piston to partially balance the pressure on the lower side of the valve head. See Figure 5.

Figure 5:
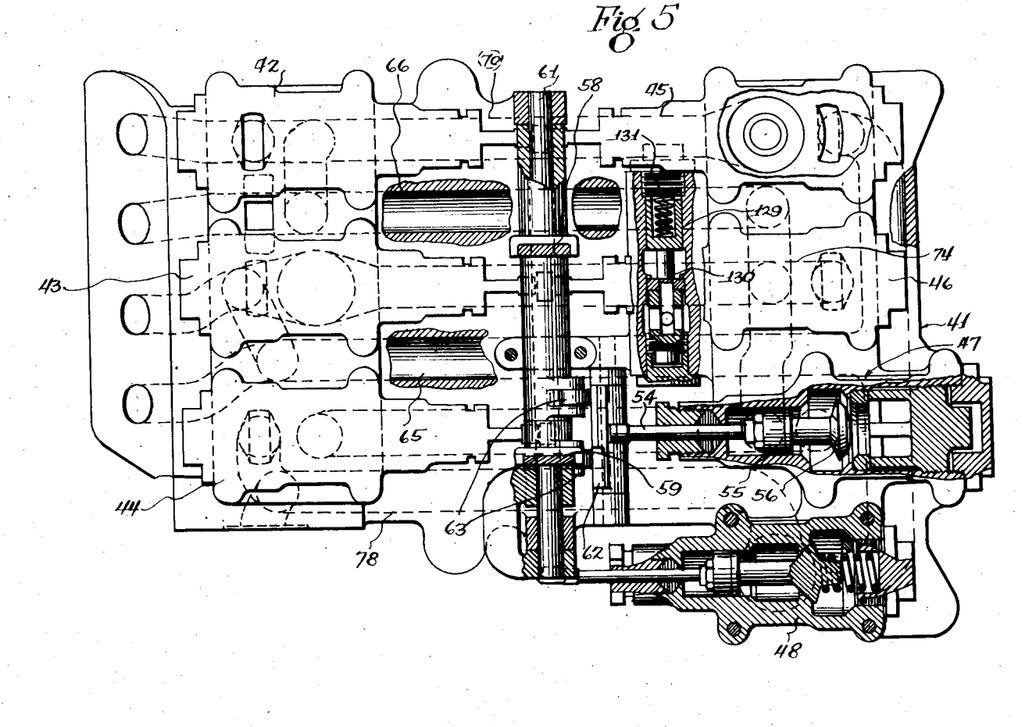
Figure 5 is an enlarged plan view of the platform valves with parts broken away.
Figure 6:
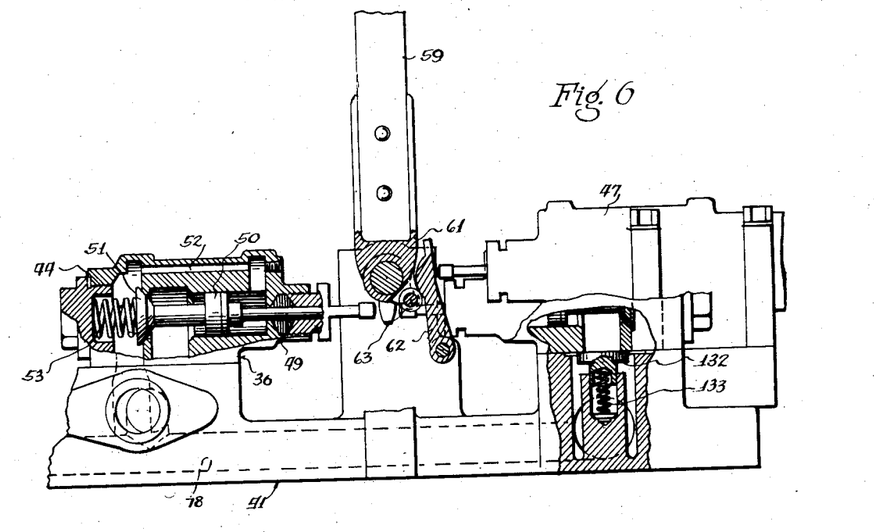
Figure 6 is a side elevation of the platform valves with parts removed and in section.
Figure 7:
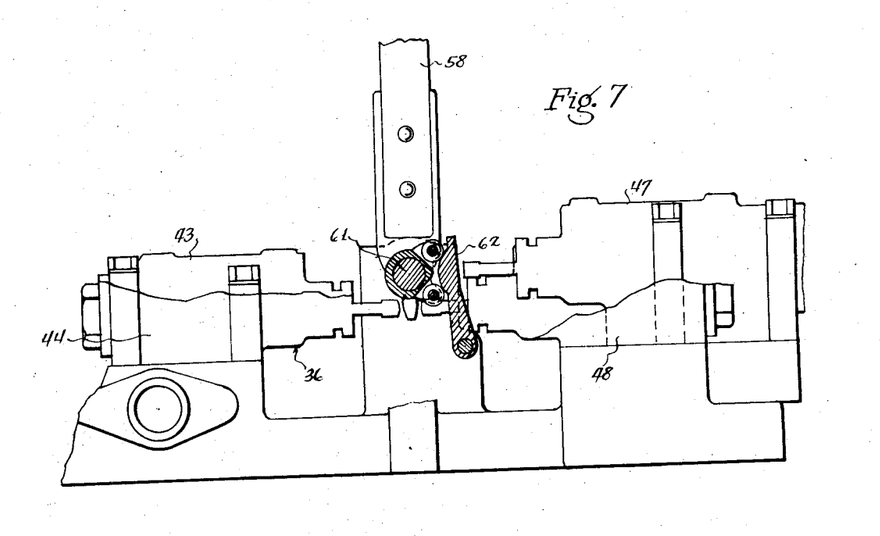
Figure 7 is a similar side elevation of the platform valves with parts broken away at other points.

These valves 42 to 48 inclusive are arranged in opposing banks horizontally with their stems extending toward opposite banks, and the valves 42 to 46 inclusive and 48 close in the direction of opposing banks while the valve 47 opens in the direction of the opposing bank. A pair of hand levers 58 and 59 are pivotally mounted on a shaft 61 disposed intermediate and extending longitudinally of said banks of valves. The lower end of the lever 58 is interposed between the stems 49 of the valves 42 and 43 in one bank and the stems of the valves 45 and 46 in the other bank whereby to open the valves 42 and 43 when moved in one direction and to open the valves 45 and 46 when moved in the other direction, these valves all being closed by the springs 53 thereof when this lever is in its intermediate position as shown in Figures 5 and 7. The lower end of the lever 59 is interposed between the stems of the valves 44 and 48 in opposite banks whereby to open the valve 44 when moved in one direction and to open the valve 48 when moved in the other direction, these valves both being closed by the springs 53 thereof, when this lever is in its intermediate position as shown in Figures 5 and 6. The levers 58 and 59 extend upwardly from their axes for convenient manual manipulation. A rocker member 62 is pivoted on an axis parallel with and below the axis of the levers 58 and 59 and is engageable against the stem 54 of the valve 47 for closing the same. Two rollers 63 are mounted radially on the lever 58 adjacent the axis thereof and are spaced angularly to effect closing of the valve 47 with opposite movements of this lever. A roller 63 is mounted radially on the lever 59 adjacent the axis thereof to effect closing of the valve 47 with movement of this lever in the direction for opening the valve 48 as shown in dotted lines in Figure 6. Thus the valve 47 is closed with movement of the lever 58 in either direction or with the movement of the lever 59 in the direction for opening the valve 48, and the arrangement is such that the valve 47 is closed upon further valve opening movements of either of the levers 58 and 59 after respective of the valves 42, 43, 45 and 46 and valve 48 have been opened for purposes hereinafter described.

Referring particularly to Figures 8 to 11 inclusive, the fluid circulates from the pump 7 through a high pressure pipe 64 which connects with a passage 65 of the manifold 41 which in turn communicates with the valves 43, 45 and 48 above the heads thereof, so that these valves closed with the pressure from the pump, and with the valve 47 below the head thereof so that this valve closes against the pressure from the pump. The valves 42 to 46 inclusive, and 48 are normally closed and the valve 47 is normally open so that under idling conditions with the pump operating, see Figure 8, the fluid from the pump passes through the valve 47 into a passage 66 in the manifold 41 communicating with the valve 47 above the head thereof and from thence into a return pipe 67 leading from the passage 66 into a tank 68 mounted on the turntable 5 rearwardly on the same side of the turntable as the manifold 41 is disposed. See Figures 1 and 2. The pump 7 draws fluid from the tank through a pipe 69.

It will be observed that the valve 47 by-passes the fluid pressure from the pump 7 and it is accordingly hereinafter termed the by-pass valve, and the valves 43, 45 and 48 serve for selectively applying the pressure from the pump to the hydraulic actuating devices and are accordingly hereinafter termed pressure valves. The valves 42, 44 and 46 communicate below the heads thereof with the passage 66 and serve for selectively releasing fluid from the hydraulic devices and are accordingly hereinafter termed release valves.

A passage 70 in the manifold 41 communicates with the release valve 42 above the head thereof and with the pressure valve 45 below the head thereof, and a pipe 71 leads from this passage to a swivel joint 72. This swivel joint is disposed coaxially with the elevating arm 19 to provide for movement of the arm, and a pipe 73 carried with the elevating arm leads from this swivel joint to one of the radial in cylinders 29 whereby the valves 42 and 45 communicate therewith for supplying fluid pressure to the radial in cylinders and releasing fluid therefrom.

A passage 74 in the manifold 41 communicates with the pressure valve 43 below the head thereof with the release valve 46 above the head thereof, and a pipe 75 leads from this passage to a swivel joint 76. This swivel joint is also disposed coaxially with the elevating arm 19 to provide for movement of the arm, and a pipe 77 carried with the elevating arm leads from this swivel joint to one of the radial out cylinders 27 whereby the valves 43 and 46 communicate therewith for supplying fluid pressure to the radial out cylinders and releasing fluid therefrom.

A passage 78 in the manifold 41 communicates with the release valve 44 above the head thereof and with the pressure valve 48 below the head thereof, and a pipe 79 leads from this passage to the aforementioned swivel joint 26 whereby the valves 44 and 48 communicate with the lifting cylinder for supplying fluid pressure to this cylinder and for releasing fluid therefrom.

The front and rear beam valves 37 and 38 serve respectively to connect the radial out cylinders 27 in series and the radial in cylinders 29 in series or to seal the second radial in and out cylinders and communicate the first of the radial in and out cylinders with respective ends of the ejector cylinders 32 for locking the beam against longitudinal movement and actuating the ejector plate 31.

Accordingly, the front beam valves 37 are connected with the first of the radial out cylinders 27 by means of a passage 90 and the hollow plunger 28 of this cylinder, and with the second of the radial out cylinders by means of a passage 91 and the hollow plunger of this cylinder, and with the rear of the ejector cylinders 32 by means of pipes 95. The rear beam valves 38 are connected with the first of the radial in cylinders 29 by means of a passage 93 and the hollow plunger 30 of this cylinder, and with the second of the radial in cylinders by means of a passage 94 and the hollow plunger of this cylinder, and with the front of the ejector cylinders 32 by means of a pipe 97.

The beam valves 37 and 38 are manually controlled together in a manner unnecessary to be described, and when in the positions shown in Figures 8 to 11 inclusive they connect the radial out cylinders 27 in series and the radial in cylinders 29 in series for the longitudinal reciprocation of the beam 17 by alternately introducing and releasing fluid pressure in the radial in and out cylinders by the manipulation of the lever 58 as hereinafter described. When the beam valves 37 and 38 are in their other positions the second of both the radial in and out cylinders are sealed to lock the beam 17 against longitudinal movement and the first radial out cylinder is communicated with the rear ends of the ejector cylinders 32 and the first radial in cylinder is communicated with the front ends of the ejector cylinders whereby actuation of the ejector plate 31 is effected by manipulation of the lever 58 to alternately introduce and release fluid pressure in opposite ends of the ejector cylinders.

Fluid pressure from the high pressure pipe 64 is conducted to the jack valves 39, which are manually operated in a manner unnecessary to be described, through a pipe 120 and the jack valves are connected with the jack cylinder by means of a pipe 123. The jack valves are also connected with the feed pipe 69, and the arrangement is such that when the jack valves are in one position, as shown in Figures 8 to 11 inclusive, fluid pressure from the high pressure pipe 64 is introduced into the jack cylinder 3 to operate the piston 4 thereof upwardly, and when these valves are in their opposite positions the fluid in the jack cylinder is released into the feed pipe 69 to lower the cylinder 4.

Referring now to Figures 8 to 11 inclusive, a brief description of the operation of the hydraulic devices, as relates particularly to the platform valves 36, will now be given.

Figure 8:
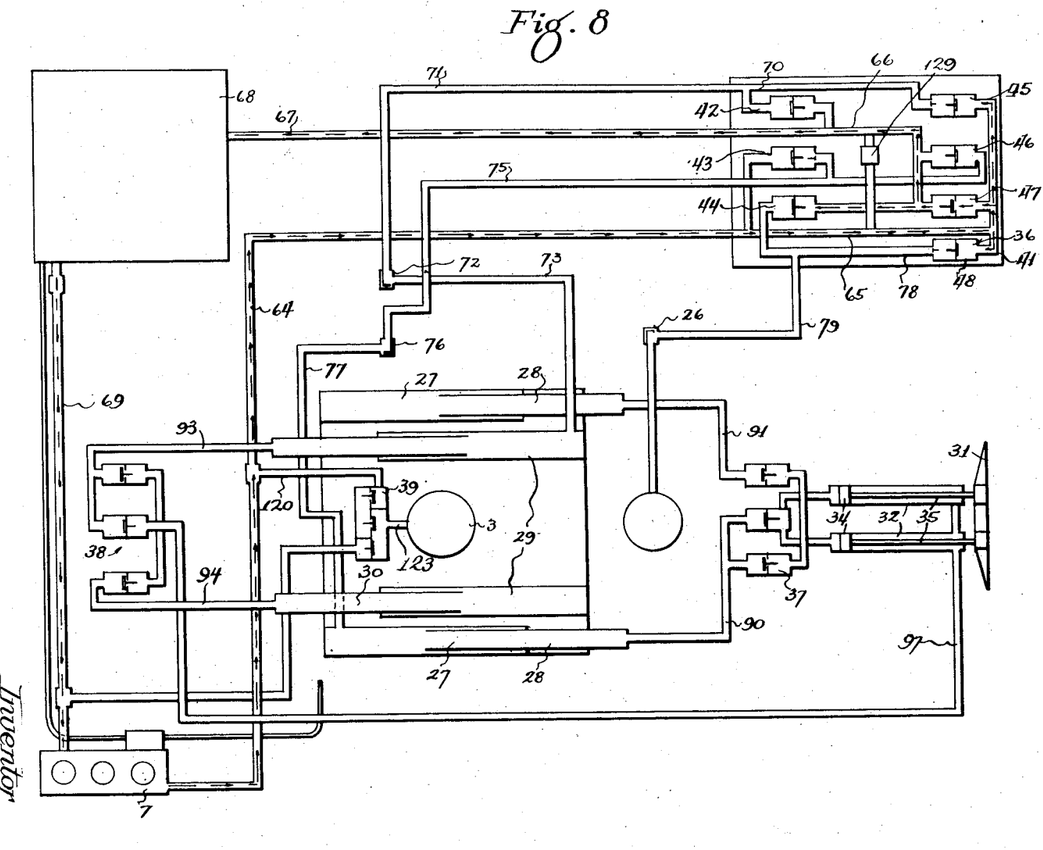
Figures 8, 9, 10 and 11 are diagrammatic views of the fluid pressure system showing various paths of the fluid during various positions of the control valves thereof.

Figure 8 shows the idle circulation of the fluid from the pressure line 64 through the valve 47 into the low pressure line 67, the jack valves 39 being positioned for introducing fluid pressure into the jack cylinder 3.

Figure 9:
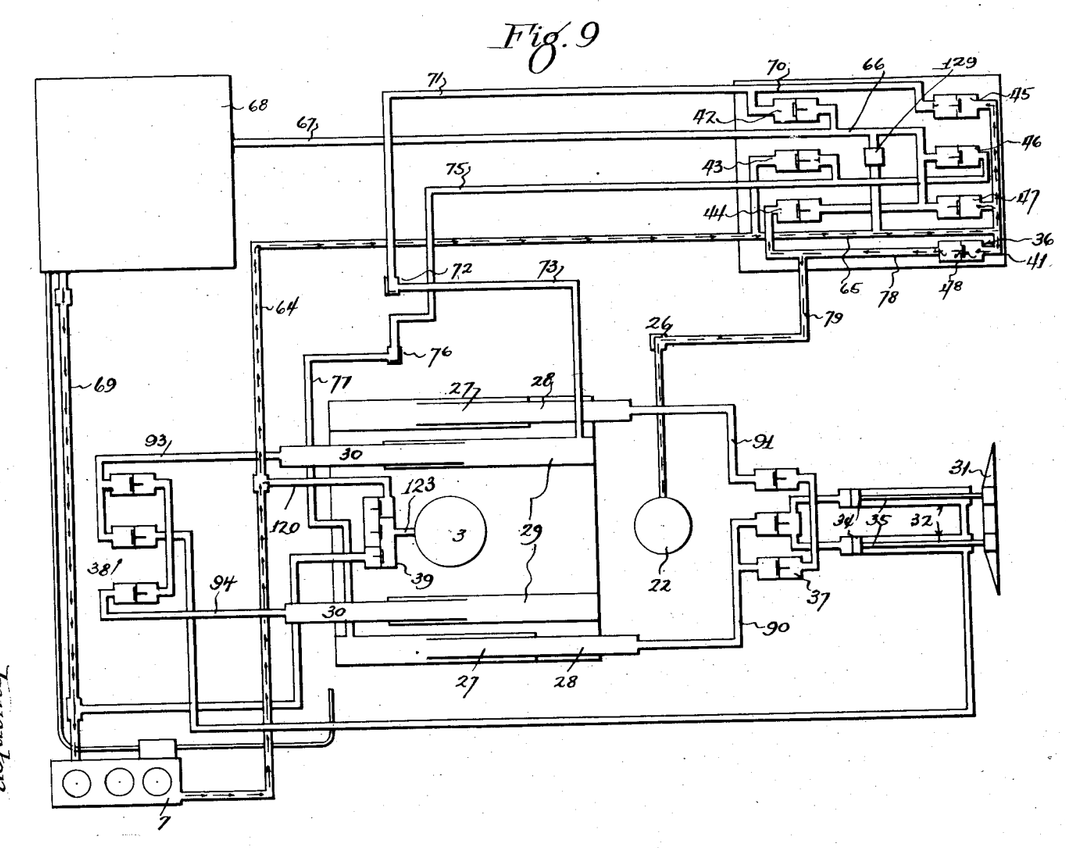

Figure 9 shows the platform valves 39 in the positions for exerting pressure in the lift cylinder 22 to lift the elevating arm 19. For effecting this condition the lever 59 is actuated to open the pressure valve 48 and then to close the by-pass valve 47. To release the fluid pressure from the lift cylinder the lever 59 is operated to the reverse position in which the release valve 44 is open to release fluid from the lift cylinder and the valves 47 and 48 respectively opened and closed, the weight of the elevating arm and parts carried thereby serving to bring them to their lower positions when the valve 44 is opened.

Figure 10:
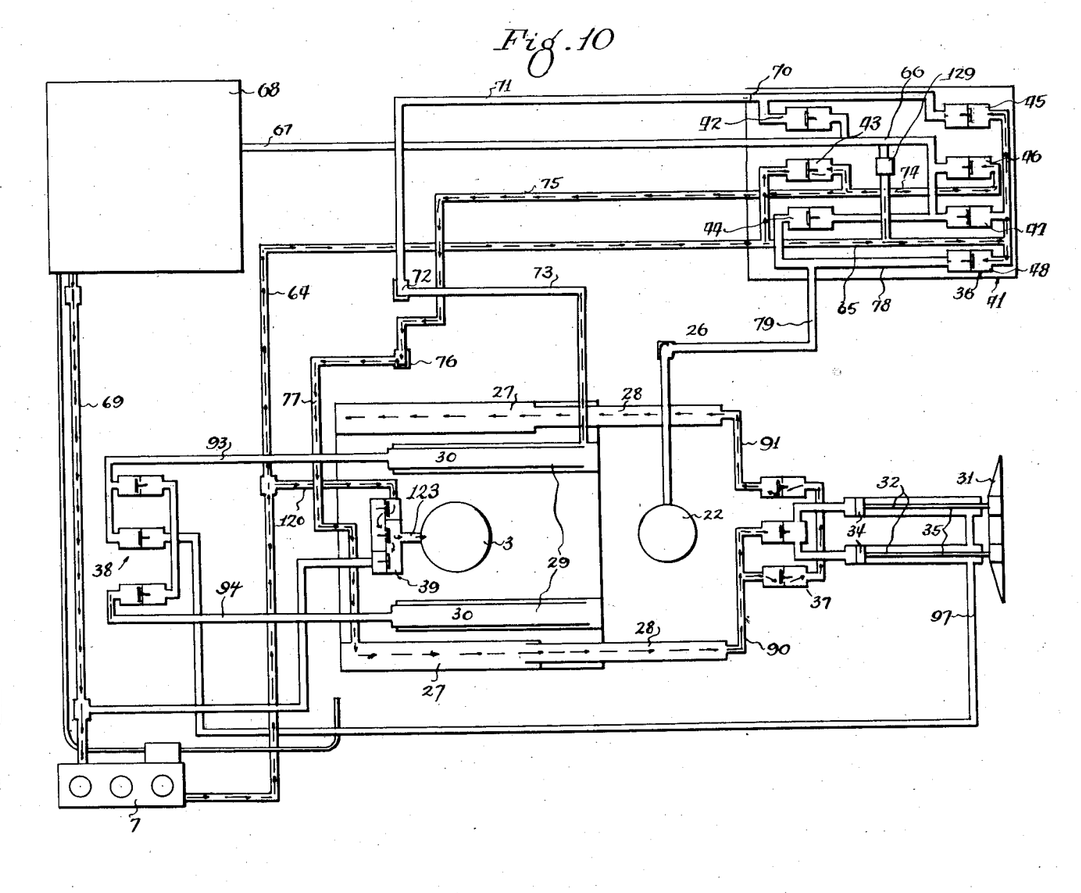

Figure 10 shows the platform and beam valves in the positions for exerting pressure in the radial out cylinders 27 for effecting outward movement of the beam 17. For effecting this condition the beam valves 37 and 38 are positioned as shown to connect the radial out cylinders 27 in series and the radial in cylinders 29 in series, and the lever 58 is actuated to open the valves 42 and 43 and then to close the valve 47. The opening of the valve 43 applies pressure to the out cylinders upon closure of the valve 47, and the opening of the valve 42 releases fluid from the in cylinders as the beam moves outwardly.

Figure 11:
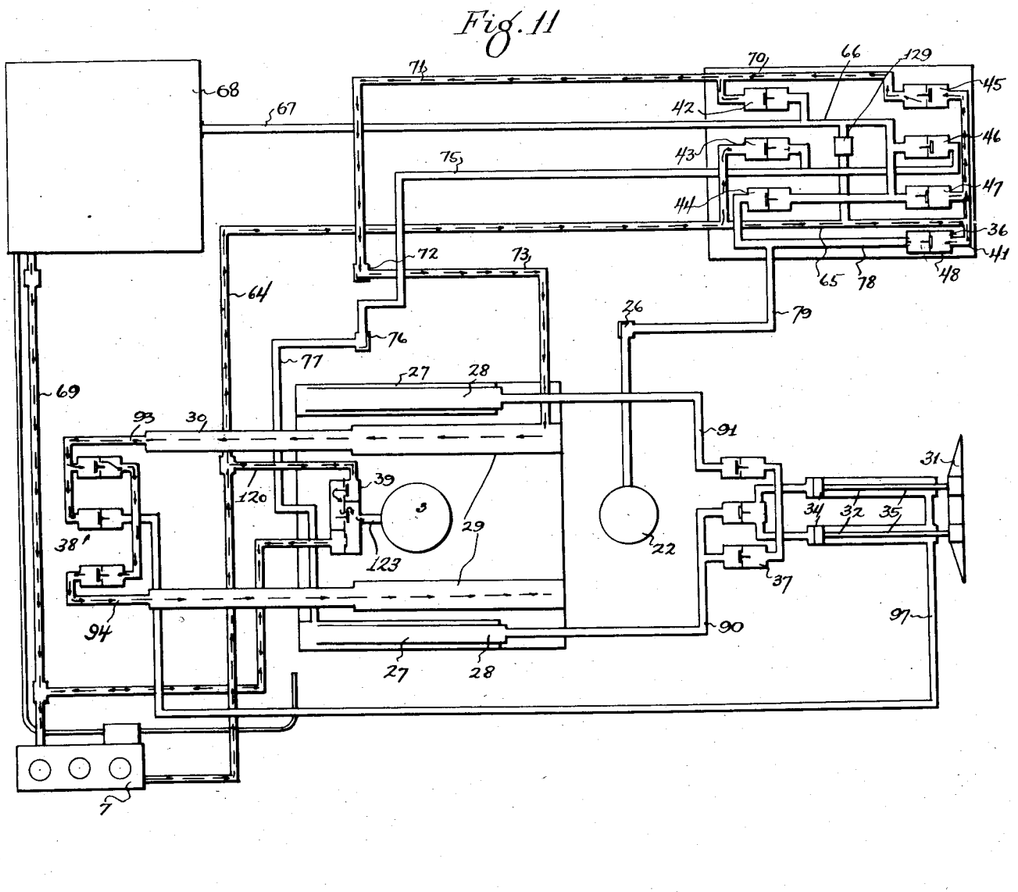

Figure 11 shows the platform and beam valves in the positions for exerting pressure in the radial in cylinders 29 for effecting inward movement of the beam. For effecting this condition the beam valves are positioned as shown to connect the radial out cylinders in series and the radial in cylinders in series, and the lever 58 is actuated to open the valves 45 and 46 and then to close the valve 47. The opening of the valve 45 applies pressure to the in cylinders upon closure of the valve 47, and the opening of the valve 46 releases fluid from the out cylinders as the beam moves inwardly In order to operate the ejector plate 31 the beam valves 37 and 38 are positioned to seal the second radial in and out cylinders and to communicate the first radial in and out cylinders with respective ends of the ejector cylinders 32. The sealing of the second radial in and out cylinders locks the beam against longitudinal movement, and when the beam valves are so positioned manipulation of the lever 58 in opposite directions effects ejecting and retracting movement of the ejector plate 31 by the alternate introduction of fluid pressure into and release of fluid from opposite ends of the ejector cylinders, the manipulation of the lever 58 effecting actuation of the valves 42, 43, 45, 46 and 47 in the same manner in which they are actuated for the longitudinal operation of the beam.

A safety valve 129 is connected across the passages 65 and 66 of the manifold 41 and operates to release excessive pressure developed by the pump 7, this valve consisting of a valve head 130 closing against the pressure in the passage 65 and normally held closed against said pressure by a spring 131. See Figure 5.

An automatic check valve 132 is provided between each of the pressure valves 43, 45 and 48 and the respective hydraulic actuating devices, and these check valves are arranged to open with the fluid pressure from the pump 7 and to close with pressure from the opposite direction to prevent pressure developed in the several hydraulic devices from passing into the passageway 65 with the result that the hydraulic actuating devices controlled by the platform valves are locked in position when the levers 58 and 59 are in their normal positions. See Figures 8 to 11 inclusive. These valves are disposed in respective passages 70, 74 and 78 of the manifold 41 in vertical positions and are spring pressed by springs 133 upwardly against the lower surfaces of the bodies of respective of these valves to close the ports thereof communicating with respective of these passages. See Figure 6.

It will be observed that the lever 58 controls the longitudinal movement of the beam 17 or the actuation of the ejector plate 31 depending upon the position of the beam valves 37 and 38, and that the lever 59 controls the vertical position of the elevating arm 19 and the beam. The construction and arrangement of the platform valves and the control mechanism thereof provides a simple and effective selective control particularly with a view toward simplicity and ease of manipulation. Attention is directed to the fact that the by-pass valve 47 serves to by-pass the fluid pressure from the pump 7 except when it is closed as hereinabove described, and that in the preferred arrangement this valve automatically opens when manual manipulation or control of the levers 58 and 59 ceases. It will be further observed that the pressure valves 43, 45 and 48 are opened while the fluid pressure from the pump 7 is by-passed. When selection has been made by the closure of a pressure valve the by-pass valve is then closed to effect the selected actuation, the proper release valve having been opened for permitting the selected actuation. It will also be observed that the mechanical structure and arrangement of the platform valves and the control mechanism is quite simple and well adapted for its purpose.

This application is a division of my co-pending application for Letters Patent of the United States for improvement in power shovels, filed October 29, 1925, Serial No. 65,549.

While I have shown herein and described one form of my invention, I do not wish to be limited to the precise details of construction or arrangements of parts herein shown and described except as specifically limited in the appended claims.

I claim as my invention:

1. In a power shovel, the combination with a hydraulic actuating device, of a manually controlled valve for applying a fluid pressure thereto, and a second manually controlled valve for by-passing said fluid pressure from said first mentioned valve.

2. In a power shovel, the combination with a hydraulic actuating device, of a manually controlled valve for applying a fluid pressure thereto and normally closed, and a second manually controlled valve normally open for by-passing said fluid pressure from said first mentioned valve.

3. In a power shovel, the combination with a hydraulic actuating device, of a valve for applying a fluid pressure thereto and normally closed, a second valve normally open for by-passing said fluid pressure from said first mentioned valve, a manually controlled actuating member for actuating said first mentioned valve, and means for closing said second valve by actuation of said manually controlled member while said first mentioned valve is maintained in open position thereby.

4. In a power shovel, the combination with a hydraulic actuating device, of a valve for applying a fluid pressure thereto and yieldably urged into closing position, a second valve for by-passing said fluid pressure from said first mentioned valve and yieldably urged into open position, a manually controlled pivoted member for opening said first mentioned valve and means for closing said second valve upon continued valve opening movement of said pivoted member after said first mentioned valve has been opened.

5. In a power shovel, the combination with a hydraulic actuating device, of a balanced poppet valve arranged to open against a fluid pressure for applying the same to said actuating device, a spring yieldably urging said valve into closed position, a second partially balanced poppet valve for by-passing said fluid pressure from said first mentioned valve and arranged to close against said pressure, a pivoted hand lever for opening said first mentioned valve, a pivoted rocker member for closing said second valve, and a roller mounted radially on said lever for actuating said rocker member to close said second valve upon continued valve opening movement of said lever after said first mentioned valve has been opened.

6. In a power shovel, the combination with a hydraulic actuating device, of a pair of pressure and release valves respectively for applying a fluid pressure to said actuating device and releasing fluid therefrom, means for controlling said valves and adapted to alternately open said valves with opposite movements thereof, a third valve for by-passing said fluid pressure from said pressure valve, and means adapted to close said third valve by actuation of said control means while maintaining said pressure valve in open position.

7. In a power shovel, the combination with a hydraulic actuating device, of a pair of pressure and release poppet valves respectively for applying a fluid pressure to said actuating device and releasing fluid therefrom and opening against said fluid pressure, a pivoted lever for alternately opening said valves with opposite movements thereof. a third poppet valve for by-passing said fluid pressure from said pressure valve and closing against said fluid pressure, and means for closing said third valve upon continued pressure valve opening movement of said lever after said pressure valve has been opened.

8. In a power shovel, the combination with a hydraulic actuating device, of a pair of balanced pressure and release poppet valves respectively for applying a fluid pressure to said actuating device and releasing fluid therefrom, said valves being oppositely arranged and closing in directions toward each other and with said fluid pressure, springs for yieldably urging said valves into closed positions, an automatic check valve between said pressure valve and said actuating device and opening with said fluid pressure, a pivoted hand lever interposed between said pressure and release valves for alternately opening the same with opposite movements thereof, a third partially balanced poppet valve for by-passing said fluid pressure from said pressure valve and opening with said fluid pressure, and means for closing said third valve upon continued pressure valve opening movement of said lever after said pressure valve has been opened.

9. In a power shovel, the combination with hydraulic actuating means, of two pairs of cooperating pressure and release valves respectively for selectively applying a fluid pressure to said actuating means and releasing fluid therefrom and normally closed, a pair of independently operable manually controlled members for alternately opening the valves of respective of said pairs with opposite movements thereof, a fifth valve normally open for by-passing said fluid pressure from said pressure valves, and means adapted to close said fifth valve upon continued pressure valve opening movement of either of said manually controlled members after the respective pressure valve has been opened.

10. In a power shovel, the combination with hydraulic actuating means, of two pairs of cooperating pressure and release balanced poppet valves respectively for selectively applying a fluid pressure to said actuating means and releasing fluid therefrom, said valves being arranged in opposing banks with the valves of each pair disposed in opposite banks and closing in directions toward each other and with said fluid pressure, springs yieldably urging said valves into closed positions, a pair of coaxial pivoted hand levers interposed between respective pairs of valves for alternately opening the same with opposite pivotal movements thereof, a fifth partially balanced poppet valve for by-passing said fluid pressure from said pressure valves and opening with said fluid pressure, and disposed similarly with one of said banks, a pivoted rocker member disposed on an axis parallel with that of said levers for closing said fifth valve, and means on said levers for actuating said rocker member to close said fifth valve upon continued pressure valve opening movement of either lever after the respective pressure valve has been closed.

11. In a power shovel, the combination with a double acting hydraulic actuating means and a single acting hydraulic actuating means, of two pairs of cooperating pressure and release valves for respectively applying a fluid pressure to and releasing fluid from respective opposite portions of said double acting means and normally closed, manually controlled means for alternately opening the pressure valve of one pair and the release valve of the other pair with one movement thereof and for opening the other pressure and release valves with the opposite movement thereof, a third pair of cooperating pressure and release valves for respectively applying said fluid pressure to and releasing the same from said single acting means and normally closed, a second manually controlled means for alternately opening the pressure and release valves of said third pair with opposite movements thereof, a seventh valve normally open for by-passing said fluid pressure from said pressure valves, and means for closing said seventh valve upon continued pressure valve opening movement of either of said manually controlled means after a respective pressure valve has been opened.

12. In a power shovel, the combination with a double acting hydraulic actuating means and a single acting hydraulic actuating means, of two pairs of cooperating pressure and release valves for respectively applying a fluid pressure to and releasing fluid from respective opposite portions of said double acting means, a third pair of cooperating pressure and release valves for respectively applying said fluid pressure to and releasing fluid from said single acting means, said valves being yieldably urged into closed positions and arranged in opposing banks with the valves of each pair in opposite banks and closing in directions toward each other and with the pressure valves of said first mentioned two pairs disposed in opposite banks, a pair of pivoted hand levers disposed on an axis intermediate and extending longitudinally of said banks, one of said levers being interposed between said first mentioned two pairs of valves for alternately opening the valves of these pairs in respective of said banks with opposite movements thereof and the other lever being interposed between the valves of said third pair for alternately opening the same with opposite movements thereof, a seventh valve for by-passing said fluid pressure from said pressure valves and yieldably urged into open position and arranged similarly with said valves, a rocker member disposed on an axis parallel with that of said levers for closing said seventh valve, and means on said levers for actuating said rocker member to close said seventh valve upon continued pressure valve opening movement of either of said levers after a respective pressure valve has been opened.

Signed at Chicago, in the county of Cook and State of Illinois, this 21st day of October, A. D. 1926.

WILLIAM W. SLOANE.